Aug. 1, 1944.   O. C. KOPPEN   2,355,026
AIRPLANE
Filed Oct. 9, 1943   2 Sheets-Sheet 1

INVENTOR.
Otto C. Koppen
BY H. J. Kirkpatrick
ATTORNEY

Aug. 1, 1944.   O. C. KOPPEN   2,355,026
AIRPLANE
Filed Oct. 9, 1943   2 Sheets-Sheet 2
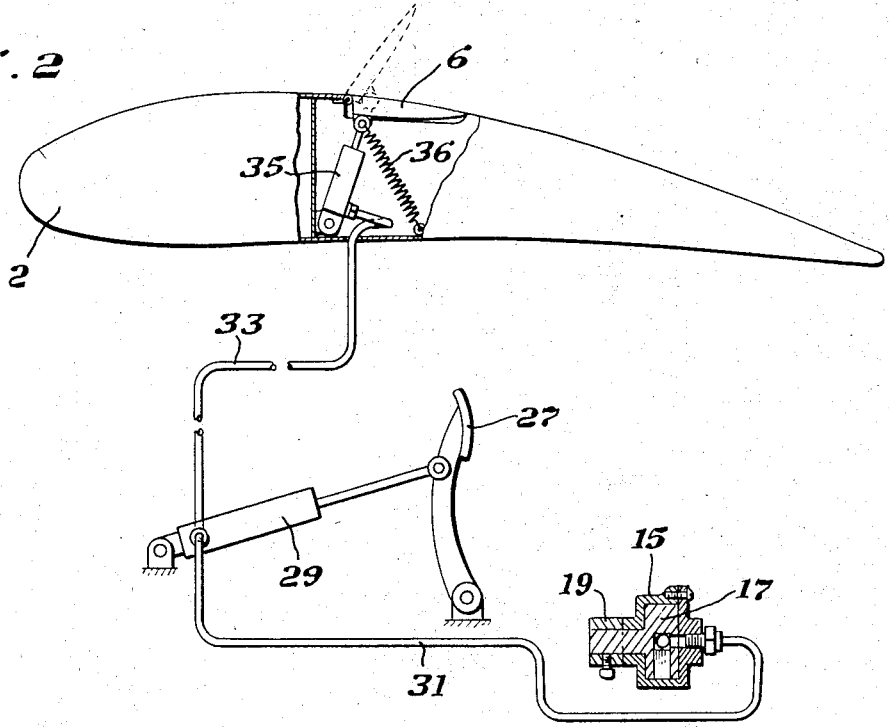
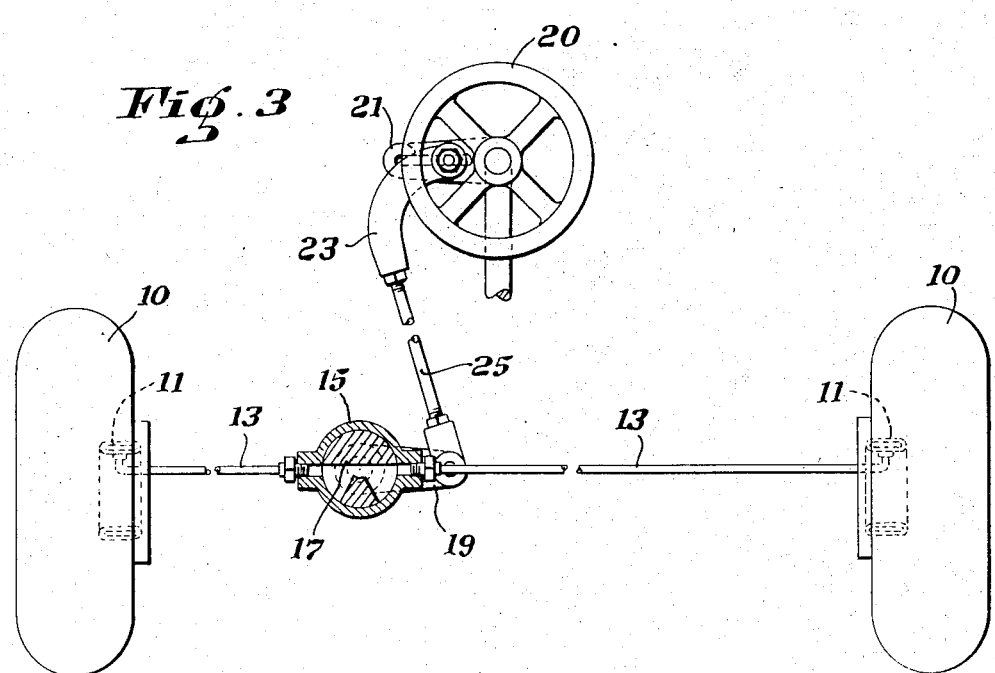
INVENTOR.
Otto C. Koppen
BY H. L. Kirkpatrick
ATTORNEY Patented Aug. 1, 1944

2,355,026

UNITED STATES PATENT OFFICE 2,355,026

AIRPLANE

Otto C. Koppen, Newton, Mass., assignor to General Aircraft Corporation, Dover, Del., a corporation of Delaware Application October 9, 1943, Serial No. 505,655

13 Claims. (Cl. 244—111)

This invention relates to airplanes and has for its object to provide new and improved flight and ground control means. The invention is particularly useful in connection with an airplane of the two-control type normally directed by direct manual operation of ailerons and elevator only, and without the use of the pilot's feet for directional control in the air.

The airplane of this invention represents a further step towards a simplified, more easily controlled, and safer airplane, primarily for ordinary civil use and, though certain features are applicable to three-control airplanes with present-day conventional landing gear, the preferred airplane, in connection with which the invention is illustrated, is that of my Patent No. 2,196,994—a two-control airplane with tricycle landing gear. The present invention is directed to the aspects of glide-path control and ground control of an airplane in order to simplify problems of both and to minimize chances for error on the part of the pilot, as will appear from the detailed description of the airplane of the drawings.

In the drawings:

Fig. 2 is a diagrammatic view, partly in cross section, illustrating details of the brake and spoiler control, and Fig. 3 is another diagrammatic view further showing details of the brake control and its association with the aileron and elevator operating wheel.

Figure 1:
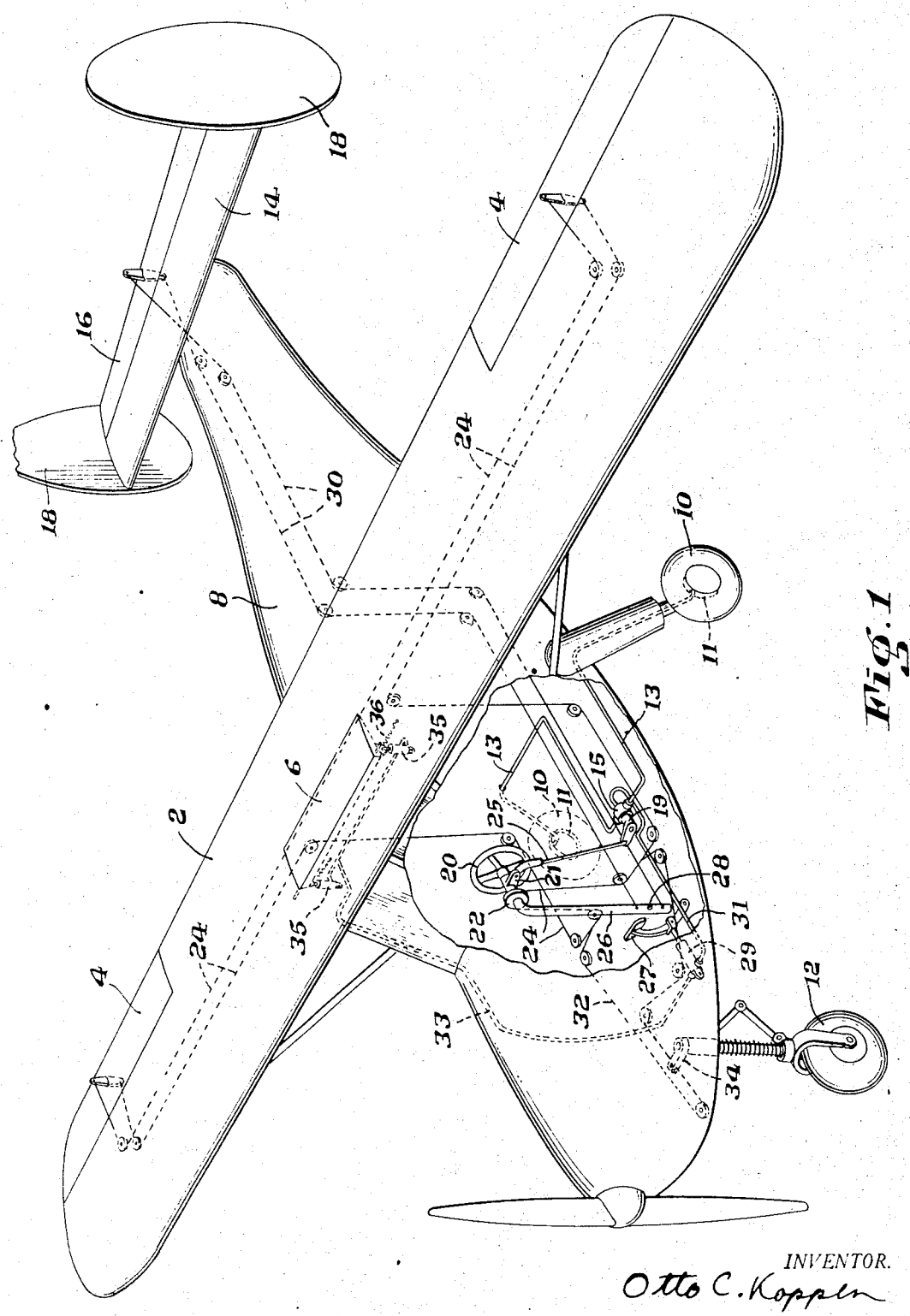
Fig. 1 is a perspective view (partly diagrammatic) of an airplane made in accordance with a preferred embodiment of my invention.

Referring to the drawings, the airplane of Fig. 1 shows an airplane of the preferred two-control type having a wing 2, with ailerons 4 and spoiler 6, affixed to a fuselage 8.

To the fuselage 8 are suitably affixed a pair of main landing wheels 10, and a casterable, steerable nose wheel 12. The fuselage 8 carries at the rear thereof a horizontal stabilizer 14 having hingedly affixed thereto an elevator 16, the stabilizer having at the ends thereof two vertical tail units generally designated at 18.

The ailerons and elevator may be controlled in conventional fashion by a Deperdussin wheel 20 suitably connected thereto by control cables, as presently described. The Deperdussin wheel 20 is mounted so as to revolve a cable drum 22 which operates aileron control cables 24 connected to the ailerons 4, as shown in Fig. 1, and a control column 26 (on the top of which the wheel 20 with its drum 22 are mounted) is pivoted about a lateral horizontal axis 28 so as to be movable fore and aft and thereby operate the elevator control cables 30. In addition to the flight control cables, the wheel 20 also operates the ground-steering control cable 32, the ends of which are attached to the aileron control cables 24, as shown, so as to be operated thereby and simultaneously therewith. In this way the wheel 20, when rotated, moves the cable 32 which, in turn, moves the steering arm 34 affixed intermediate the length of the cable 32, which arm 34 steers the nose wheel 12 in accordance with the direction and extent of rotation of the wheel 20, the nose wheel 12 being steered to the right when the wheel 20 is turned by the pilot to the right, and vice versa. The directional steering movement by the wheel of the airplane in the air is thus the same as its directional steering movement on the ground, and such steering movement on the ground may be further augmented by a brake connection under the control of the operator, as now described.

The main wheels 10 are equipped with hydraulic brakes, diagrammatically indicated at 11, which are respectively connected by conduits 13 to a valve housing 15 which includes therein a rotatable valve member 17. This valve member 17 in its neutral position, as shown in Figs. 2 and 3, permits the flow of both brakes 11 equally, but when rotated either way from neutral a matter of 50–60°, or thereabouts, for example, cuts off the fluid flow to one of the two brakes 11 so that hydraulic brake pressure can be applied only to the inside wheel in a turn, to the left wheel if the turn is to be to the left, for example. This is accomplished by rotating the valve member 17 through an arm 19 affixed thereto, the arm 19 being connected to an arm 21 on the wheel 20 through an arm connector 23 and rod 25, both of the latter being adjustable, as is clearly shown in Fig. 3 of the drawings.

It will thus be seen that the wheel 20 on the ground controls not only the steering of the nose wheel 12 but the differential application of braking pressure if braking pressure is supplied. The supplying of brake pressure is accomplished through the operator pressing the foot pedal 27 which actuates the brake cylinder 29 supplying hydraulic pressure to the valve housing 15, as shown in Fig. 2, and also supplying hydraulic pressure through the line 33 to the spoiler operating cylinder 35 (see Fig. 2). In normal flight the spoiler 6 is in the position shown in Fig. 1 and in Fig. 2 (solid lines), but for glide-path control purposes, as in an approach to a landing area, the spoiler is swung about the axis at the forward edge thereof to any elevated position up to the maximum position shown in dotted lines in Fig. 2 by means of the pilot depressing the pedal 27, the retraction being accomplished by means of the release of the pedal and the spring 36 as shown.

The airplane in flight, then, in an approach glide, may be controlled by the operator depressing the pedal 27, thus extending the spoiler and steepening the glide-path to the extent desired, and, upon ground contact, the pilot's foot simply continues to apply pressure or release pressure to secure the wheel braking effect as desired. Preferably, the hydraulic mechanism is made and adjusted so that upon an initial partial depression of the foot pedal 27, the spoiler is at once elevated, this being followed by an actuation of the brakes 11 as the pedal is further depressed. The device is substantially fool-proof when employed in a tricycle landing gear airplane as shown, for even if the airplane be landed with the brakes on, no substantial harm results.

In practice, it will be found, particularly with inexperienced pilots, that it is of substantial advantage to have the pilot employ but a single brake pedal for applying "brakes" in the air as well as brakes on the ground, as it makes for simplicity both in thought and action in the control and operation of the airplane both in the air and on the ground. An operator, once starting to glide, need not remove his hands from the wheel and throttle, respectively, or his foot from the brake pedal throughout the approach glide, actual landing, and subsequent taxiing to the desired position on the field. The spoiler 6 is effective not only during the approach glide but also serves to increase drag and thus shortens the landing run, as well as shortening the preceding glide.

As a modification of the structure as heretofore shown and described, the ground-steering control cable and arm may be omitted and the airplane steered on the ground solely by differential brake application, the front wheel castering as required to effect the turn.

It is contemplated that the spoiler (or spoilers) and brakes, or either of them, may be actuated through mechanical means instead of hydraulic means (as shown), and the appended claims are to be construed to cover both of said means except where hydraulic means are therein specified.

Having described my invention, what I wish to claim and secure by Letters Patent is:

1. An airplane having in combination, a body, a supporting wing, ailerons on the wing, control means for said ailerons, directionally fixed landing wheels to the rear of the center of gravity of the airplane, brakes for said landing wheels, a casterable landing wheel forward of the airplane center of gravity, a foot-operated pedal for applying brake pressure to said landing wheel brakes, and differential control means for said brakes connected to said aileron control means whereby the airplane may be steered on the ground by cooperative action of said aileron control means and differential application of said brakes.

2. An airplane having in combination, a body, a supporting wing, ailerons on the wing, control means for said ailerons, directionally fixed landing wheels to the rear of the center of gravity of the airplane, brakes for said landing wheels, a casterable landing wheel forward of the airplane center of gravity, a foot-operated pedal for normally applying equal brake pressure to said landing wheel brakes, and differential control means for said brakes connected to said aileron control means whereby the airplane may be steered on the ground by cooperative action of said aileron control means and differential application of said brakes.

3. An airplane having in combination, a body, a supporting wing, ailerons on the wing, control means for said ailerons, directionally fixed landing wheels to the rear of the center of gravity of the airplane, brakes for said landing wheels, a steerable landing wheel forward of the airplane center of gravity, a steering connection from said landing wheel to said aileron control means, a foot-operated pedal for normally applying equal brake pressure to said landing wheel brakes, and differential control means for said brakes connected to said aileron control means whereby the airplane may be steered on the ground by cooperative action of said aileron control means and differential application of said brake.

4. An airplane having in combination, a body, a supporting wing, ailerons on the wing, control means for said ailerons, directionally fixed landing wheels to the rear of the center of gravity of the airplane, brakes for said landing wheels, a steerable landing wheel forward of the airplane center of gravity, a steering connection from said landing wheel to said aileron control means, a foot-operated pedal for applying brake pressure to said landing wheel brakes, and differential control means for said brakes connected to said aileron control means whereby the airplane may be steered on the ground by cooperative action of said aileron control means and differential application of said brakes.

5. An airplane having in combination, a body, a supporting wing, ailerons on the wing, control means for said ailerons, directionally fixed landing wheels to the rear of the center of gravity of the airplane, hydraulic brakes for said landing wheels, a steerable landing wheel forward of the airplane center of gravity, a steering connection from said landing wheel to said aileron control means, a foot-operated pedal for normally supplying equal hydraulic brake pressure to said landing wheel brakes, and differential control means for said brakes, including valves for controlling the hydraulic pressure on each of said hydraulic brakes, connected to said aileron control means whereby the airplane may be steered on the ground by cooperative action of said aileron control means and differential application of said brakes.

6. A two-control airplane having in combination, a body, a supporting wing, ailerons on the wing, control means for said ailerons, elevator, and vertical control surfaces, a pair of directionally fixed landing wheels to the rear of the center of gravity of the airplane, brakes for said landing wheels, a steerable landing wheel forward of the airplane center of gravity, a steering connection from said aileron control means to said landing wheel, a foot-operated pedal for normally applying equal brake pressure to said landing wheel brakes, and differential control means for said brakes connected to said aileron control means whereby actuation of said foot-operated pedal and selective movement of said aileron control means towards one side turns the airplane towards the same side whether in the air or on the ground.

7. A two-control rudderless airplane having in combination, a body, a supporting wing, ailerons on the wing, control means for said ailerons, an elevator and two fixed vertical surfaces, a pair of directionally fixed landing wheels to the rear of the center of gravity of the airplane, brakes for said landing wheels, a steerable landing wheel forward of the airplane center of gravity, a steering connection from said aileron control means to said landing wheel, a foot-operated pedal for normally applying equal brake pressure to said landing wheel brakes, and differential control means for said brakes connected to said aileron control means whereby actuation of said foot-operated pedal and selective movement of said aileron control means towards one side turns the airplane towards the same side whether in the air or on the ground.

8. An airplane having in combination, a body, a supporting wing, a centrally located spoiler, control means for said spoiler, ailerons on the wing, control means for said ailerons, directionally fixed landing wheels to the rear of and laterally spaced from the center of gravity of the airplane, brakes for said landing wheels, a foot-operated pedal for normally applying equal brake pressure to said landing wheels, a casterable landing wheel forward of the airplane center of gravity and a connection between said control means for said brakes and said spoiler control means so that both the spoiler and said brake are applied to slow down the forward movement of the airplane on the ground, and the spoiler is applied to slow down the forward movement of the airplane in the air when off the ground.

9. An airplane having in combination, a body, a supporting wing, spoiler means symmetrically located as to the longitudinal axis of the airplane, a control for said spoiler means, ailerons on the wing, control means for said ailerons, directionally fixed landing wheels to the rear of and laterally spaced from the center of gravity of the airplane, brakes for said landing wheels, a foot-operated pedal for normally applying equal brake pressure to said landing wheels, a casterable landing wheel forward of the airplane center of gravity and a connection between said control means for said brakes and said spoiler control so that both the spoiler and said brakes are applied to slow down the forward movement of the airplane on the ground, and the spoiler is applied to slow down the forward movement of the airplane in the air when off the ground.

10. A two-control airplane having in combination, a body, a supporting wing, spoiler means symmetrically located as to the longitudinal axis of the airplane, a control for said spoiler means, ailerons on the wing, control means for said ailerons, an elevator and vertical control surfaces, directionally fixed landing wheels to the rear of and laterally spaced from the center of gravity of the airplane, brakes for said landing wheels, a foot-operated pedal for normally applying equal brake pressure to said landing wheels, a steerable landing wheel forward of the airplane center of gravity, a steering connection from said aileron control means to said steerable landing means, a connection between said control means for said brakes and said spoiler control means so that both the spoiler and said brakes are applied to slow down the forward movement of the airplane on the ground, and the spoiler is applied to slow down the forward movement of the airplane in the air when off the ground.

11. A two-control airplane having in combination, a supporting wing, a centrally located spoiler, control means for said spoiler, ailerons on the wing, control means for said ailerons, a body with a tail group including vertical fin, stabilizer, and elevator surfaces, directionally fixed landing wheels to the rear of and laterally spaced from the center of gravity of the airplane, brakes for said landing wheels, a foot-operated pedal for normally applying equal brake pressure to said landing wheels, a steerable landing wheel forward of the airplane center of gravity, a steering connection from said aileron control means to said steerable landing wheel, a connection between said control means for said brakes and said spoiler control means so that both the spoiler and said brakes are applied to slow down the forward movement of the airplane on the ground, and the spoiler is applied to slow down the forward movement of the airplane in the air when off the ground, and differential control means for said brakes connected to said aileron control means so that a movement of said control means to either side selectively turns the airplane towards that side whether in the air or on the ground.

12. A two-control rudderless airplane having in combination, a body, a supporting wing, spoiler means symmetrically located as to the longitudinal axis of the airplane, a control for said spoiler means, ailerons on the wing, control means for said ailerons, an elevator and two fixed vertical fins, directionally fixed landing wheels to the rear of and laterally spaced from the center of gravity of the airplane, brakes for said landing wheels, a foot-operated pedal for applying brake pressure to said landing wheels, a steerable landing wheel forward of the airplane center of gravity, a steering connection from said aileron control means to said steerable landing wheel, a connection between said control means for said brakes and said spoiler control so that both the spoiler means and said brake are applied to slow down the forward movement of the airplane on the ground, and the spoiler means is applied to slow down the forward movement of the airplane in the air when off the ground, and differential control means for said brakes connected to said aileron control means so that a movement of said control means to either side selectively turns the airplane towards that side whether in the air or on the ground.

13. An airplane having in combination, a body, a supporting wing, a centrally located spoiler, control means for said spoiler, ailerons on the wing, control means for said ailerons, directionally fixed landing wheels to the rear of and laterally spaced from the center of gravity of the airplane, hydraulic brakes for said landing wheels, a foot-operated pedal for normally supplying equal brake pressure to said landing wheels, a steerable landing wheel forward of the airplane center of gravity, a steering connection from said aileron control means to said steerable landing wheel, a connection between said control means for said brakes and said spoiler control means so that both the spoiler and said brake are applied to slow down the forward movement of the airplane on the ground, and the spoiler is applied to slow down the forward movement of the airplane in the air when off the ground, and differential control means for said brakes connected to said aileron control means whereby the airplane may be steered on the ground by cooperative action of said landing wheel and differential application of said brakes.

OTTO C. KOPPEN.